J. TILLMANN.
DRAG LIFTER.
APPLICATION FILED MAY 13, 1919.
1,341,159.
Patented May 25, 1920.
2 SHEETS—SHEET 2.
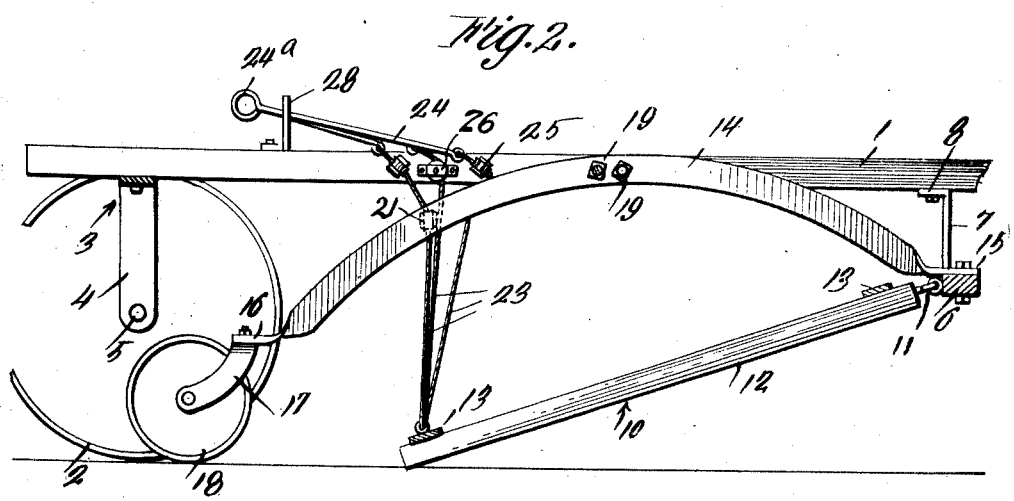
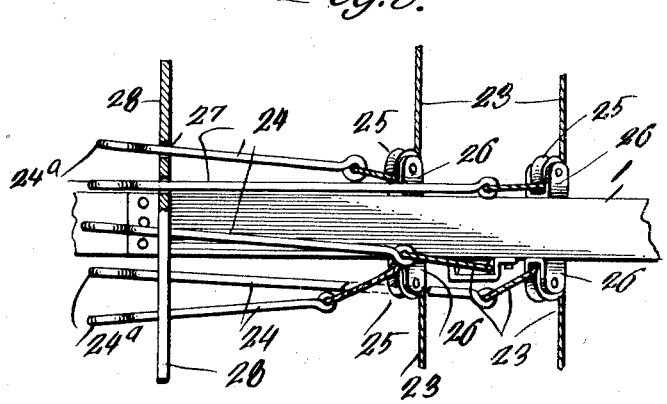
WITNESSES
Guy M. Spring
B. M. McColl
Inventor
JOSEPH TILLMANN
By Richard B. Owen
Attorney

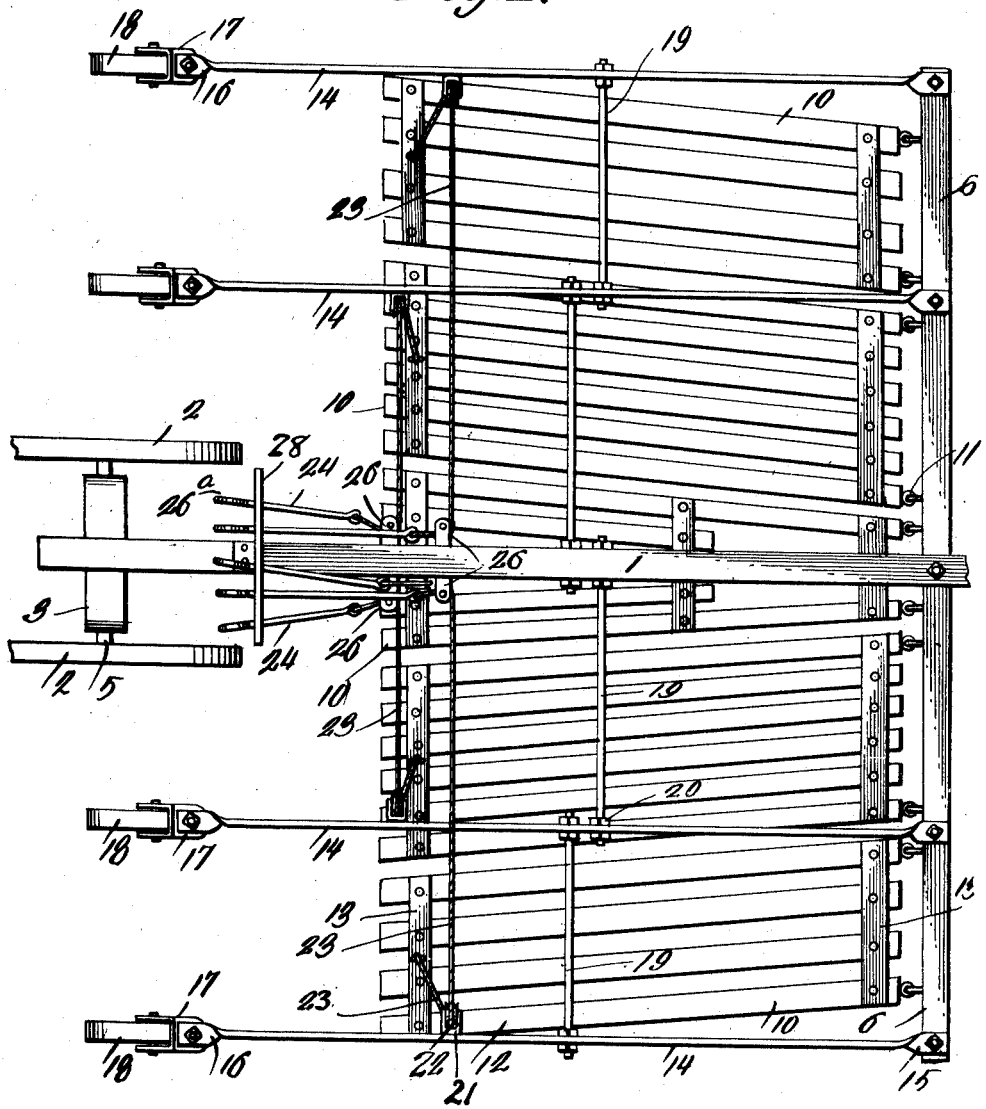

UNITED STATES PATENT OFFICE.

JOSEPH TILLMANN, OF SAUK CENTER, MINNESOTA.

DRAG-LIFTER.

1,341,159.   Specification of Letters Patent.   Patented May 25, 1920.

Application filed May 13, 1919. Serial No. 296,845.

*To all whom it may concern:*

Be it known that I, JOSEPH TILLMANN, a citizen of the United States, residing at Sauk Center, in the county of Stearns and State of Minnesota, have invented certain new and useful Improvements in Drag-Lifters, of which the following is a specification.

This invention relates to agricultural implements, and more particularly to drags. The primary object of the invention is to provide improved lifting mechanism for drags, harrows, and the like whereby the implement may be raised for transportation when going from one field to another or to and from the barn.

Another object is to so construct such mechanism that individual sections of the drag may be raised or lowered at the will of the operator.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a drag constructed in accordance with this invention and shown in operative position, Fig. 2 is a longitudinal section, and Fig. 3 is an enlarged detail plan view showing the operating means for the lifters.

In the embodiment illustrated, a tongue 1 is shown mounted on supporting wheels 2 carried by an inverted U-shaped arch or frame 3 through the free ends of the arms 4 of which extends an axle 5, the ends of which project beyond said arms and have mounted thereon the wheels 2.

An evener 6 extends transversely at a point some distance in advance of the wheels 2 and is secured to tongue 1 by a substantially Z-shaped hanger 7, the upper arm 8 of which extends rearwardly and is secured to the lower face of the tongue while the lower arm extends forwardly and is bolted to the beam or evener 6.

Loosely connected with the evener beam 6 at the front ends thereof are a plurality of drag members 10, any desired number of which may be employed, five being here shown, and which may be constructed in any suitable or desired manner. These drag members are shown connected with the evener beam 6 by eyebolts 11 to provide for their free vertical and lateral movement, said connection being in the nature of a swivel.

As shown, the central or intermediate member 10 is in fan-shape form, tapering toward its front end, while the two sections disposed on opposite sides thereof are substantially rhomboidal, being each composed of a plurality of bars or slats 12 connected at their opposite ends by cross bars 13 which are pivotally connected with the slats, to permit said slats to have a twisting or lateral movement relatively to each other.

A plurality of supporting beams 14 are rigidly secured at one end to the evener bar 6 at distances spaced equally apart as is shown clearly in Fig. 1. These beams 14 are preferably made of metal disposed edgewise with their opposed ends twisted to form flat attaching heads 15 and 16, the heads 15 being bolted to the evener bar 6 and those 16 carrying swiveled hangers 17, in which are mounted wheels or casters 18.

These beams 14 are tied together and to the tongue 1 by rods 19 secured in position by nuts as 20 positioned on opposite faces of the beams. These rods 19 operate as spacers for the beams and to prevent their lateral movement relatively to each other.

Swiveled brackets 21 are carried by the inner faces of the beams 14 at points intermediately between the rods 19 and the hangers 17. Pulleys 22 are mounted in these swiveled brackets 21, over which are designed to pass cables 23 fastened at one end to the rear cross bars 13 of the drag members and at their other ends to actuating rods 24, five of which are shown, one for each drag element.

Pulleys 25 are mounted in brackets 26 carried by the opposite side faces of the tongue 1, two pulleys being shown arranged on one side of said tongue, and three on the other, the cables connected with the respective drag elements passing around said pulleys before being connected to the actuating rods 24 as is shown clearly in Fig. 3.

The actuating rods 24 pass through longitudinally spaced apertures 27 in an edgewise disposed cross bar 28, positioned for convenient actuation by the operator. This cross bar or plate 28 is mounted on the tongue 1, being secured thereto by any suitable means, and the rods 24 which extend therethrough have their rear ends bent to form hand grips 24ª shown clearly in Fig. 2.

In the use of this invention, the parts being in the position shown in Fig. 1, when it is desired to lift one or more of the sections 10, the rod handle 24ª which controls the section to be lifted is grasped by the operator and a rearward pull exerted thereon, which causes the section to rise at its rear end, this being desirable in case a stump or other obstruction is to be passed over.

When all of these sections are to be elevated, all of the rods are drawn backward and are so held until it is desired again to lower the drag elements when the rods are released and the weight of the drags will cause them to drop by gravity into engagement with the earth, simultaneously drawing back the rods 24 into the position shown in Fig. 1, ready for use when required.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. The combination with a longitudinally extending tongue, and a cross beam carried thereby; of a plurality of drag sections loosely connected with said beam, longitudinally extending beams attached to said cross beam, wheels carried by said longitudinal beams, and cables connected for raising and lowering said drag sections individually.

2. The combination with a longitudinally extending tongue and a cross beam carried thereby; of a plurality of drag sections loosely connected at one end with said cross beam, longitudinally extending beams attached at one end to said cross beam with wheels on their other ends, pulleys carried by said beams and said tongue, and cables secured at one end to the free ends of said sections and passed over said pulleys, whereby the sections may be raised and lowered individually.

3. The combination with a longitudinally extending tongue and a cross beam carried thereby; of a plurality of drag sections loosely connected at one end with said beam, longitudinally extending arched beams attached at one end to said cross beam with wheels on their other ends, pulleys carried by said arched beams, and said tongue, cables secured at one end to the free ends of said sections and passed over said pulleys, and operating elements carried by the other ends of said cables.

4. The combination with a longitudinally extending tongue and a cross beam carried thereby; of a plurality of drag sections loosely connected at one end with said beam, longitudinally extending arched beams attached at one end to said cross beam with wheels on their other ends, the rods connecting said arched beams with each other and with said tongue, pulleys carried by said arched beams, and said tongue, cables secured at one end to the free ends of said sections and passed over said pulleys, and operating elements carried by the other ends of said cables.

5. The combination with a longitudinally extending tongue and a cross beam carried thereby; of a plurality of drag sections loosely connected at one end with said beam, longitudinally extending arched beams attached at one end to said cross beam with wheels on their other ends, the rods connecting said arched beams with each other and with said tongue, pulleys swiveled on said arched beams, pulleys carried by said tongue, cables secured at one end to the free ends of said drag sections and passing over said pulleys, and rods connected with the free ends of said cables.

6. The combination with a longitudinally extending tongue and a cross beam carried thereby; of a plurality of drag sections loosely connected at one end with said beam, longitudinally extending arched beams attached at one end to said cross beam with wheels on their other ends, the rods connecting said arched beams with each other and with said tongue, pulleys swiveled on said arched beams, pulleys carried by said tongue, a cross bar mounted on said tongue, rods slidable in said bar, cables secured at one end to said sections and passing over said pulleys, and connected at their other ends to said rods.

7. The combination with a longitudinally extending tongue and a cross beam carried thereby; of a plurality of drag sections loosely connected at one end with said beam, longitudinally extending arched beams composed of metal bars disposed edgewise with their ends twisted and apertured to form attaching elements, one of said ends being bolted to said cross beam, wheels swiveled to the other ends of said arched beams, connectors between said arched beams and tongue, pulleys on said arched beams, and tongue, and cables connected with said sections and passing over said pulleys.

In testimony whereof I affix my signature in presence of two witnesses.

JOSEPH TILLMANN.

Witnesses:
A. G. MURTEL,
L. O. SCHOENHOFF.